United States Patent [19]

Webster

[11] 4,218,091
[45] Aug. 19, 1980

[54] RECLINABLE VEHICLE CHAIR AND CONVERSION METHOD

[75] Inventor: David L. Webster, Orange, Calif.

[73] Assignee: Kustom Fit Manufacturing Company, South Gate, Calif.

[21] Appl. No.: 919,497

[22] Filed: Jun. 27, 1978

[51] Int. Cl.³ .............................................. A47C 1/024
[52] U.S. Cl. ..................................... 297/354; 297/361
[58] Field of Search ................ 297/354, 355, 363–365, 297/374–376, 379

[56] References Cited

U.S. PATENT DOCUMENTS

| | | | |
|---|---|---|---|
| 1,501,300 | 7/1924 | Bayles | 297/363 |
| 1,721,366 | 7/1929 | Backstrom | 297/379 X |
| 1,973,627 | 9/1934 | Harter | 297/363 |
| 3,288,526 | 11/1966 | Fiala | 297/354 |
| 3,739,885 | 6/1973 | Bainbridge | 297/355 X |
| 4,004,836 | 1/1977 | Kristensson | 297/354 |

FOREIGN PATENT DOCUMENTS

| | | | |
|---|---|---|---|
| 282034 | 4/1952 | Switzerland | 297/363 |
| 322932 | 7/1957 | Switzerland | 297/363 |

Primary Examiner—William E. Lyddane
Attorney, Agent, or Firm—Fulwider, Patton, Rieber, Lee & Utecht

[57] ABSTRACT

A reclinable vehicle chair having a seat frame and a back frame which are adapted to be folded flat for shipping and storage. The back frame can be pivoted to an upright position and rigidly held there by a disconnectably mounted interconnecting member. The chair structure enables conversion of the chain to a reclining type by interchanging a recliner mechanism for the interconnecting member. A method is disclosed to effect such conversion.

3 Claims, 7 Drawing Figures

U.S. Patent   Aug. 19, 1980   4,218,091
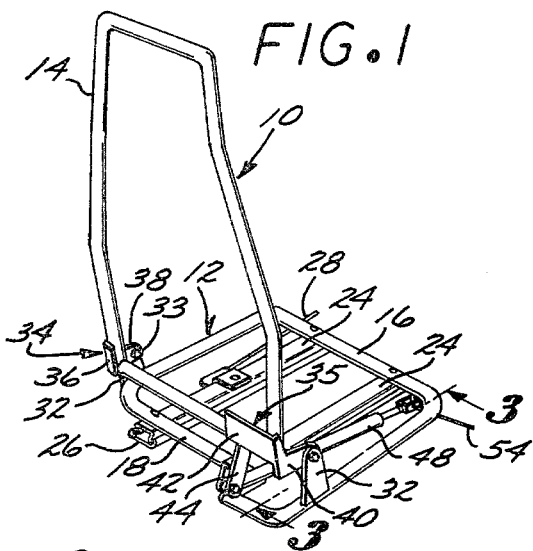
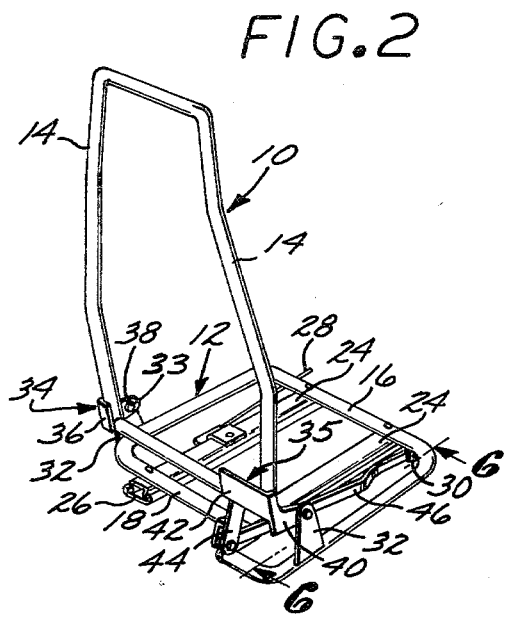
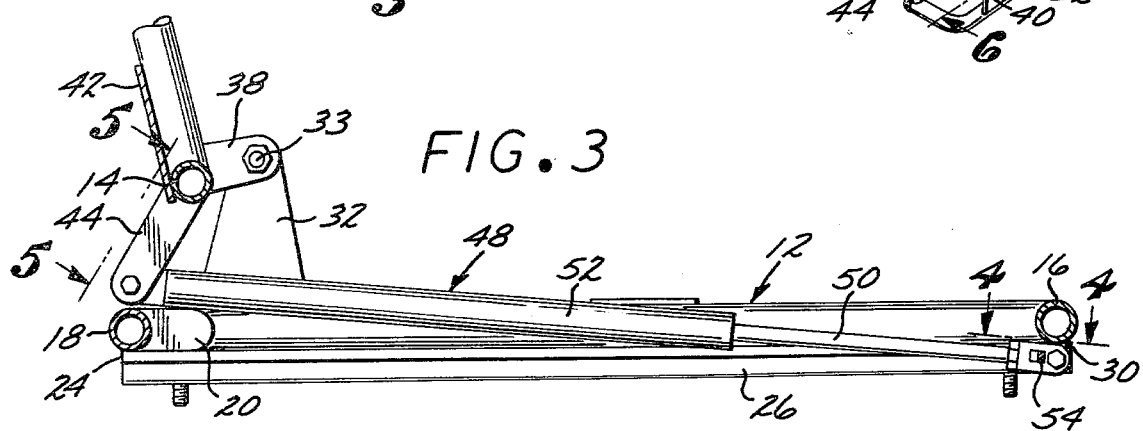
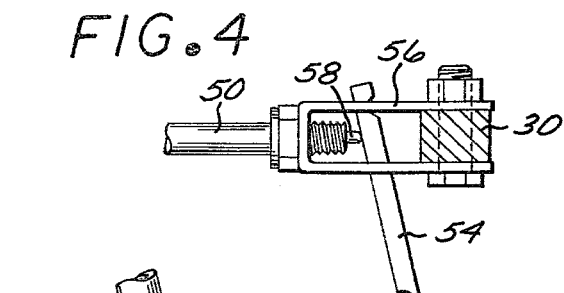
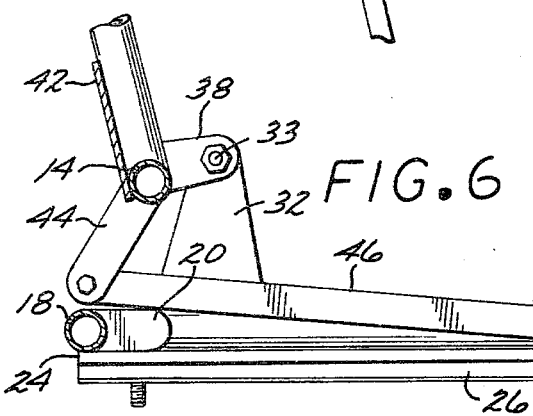
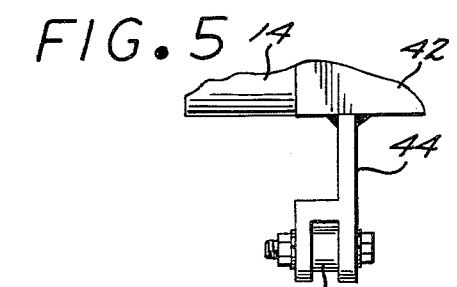
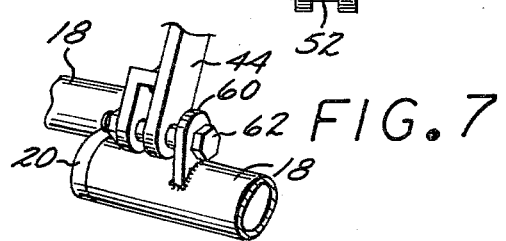
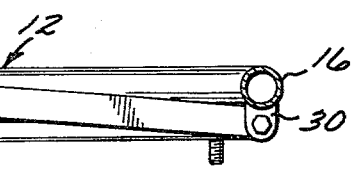

RECLINABLE VEHICLE CHAIR AND CONVERSION METHOD

BACKGROUND OF THE INVENTION

1. Field of the Invention

The present invention relates to a vehicle chair convertible from a fixed chair to a reclinable chair, and to a method for effecting such conversion.

2. Description of the Prior Art

Recreational vehicles are commonly fitted with recliner chairs for the driver. The recliner mechanism of such a chair allows the driver to adjust the angle of the seat back to best suit his or her driving needs. Sometimes recliner chairs are also provided for orher passengers, but more often less expensive fixed chairs are installed for the passengers. Frequently the vehicle owner wishes to use additional recliner chairs for the originally installed fixed chairs. However, with the chair designs of the prior art conversion of a fixed chair to a reclinable chair normally requires removal of the fixed chair altogether, and substitution of a completely different recliner type.

In addition, although some prior art recliner chairs can be folded flat for easy shipping, this is not usually the case with fixed chair types, which are most often shipped in an upright, space consuming position. Also, since existing recliner chairs and fixed chairs differ so greatly in their construction and operation, dealers normally must stock both types. The costs of maintaining such an inventory, and providing the required storage space, undesirably inflate the dealer's cost of doing business. It would be desirable to have a vehicle chair capable of service either as a fixed chair or as a reclinable chair, which could be easily convertible from one type to the other, and capable of shipment in a flat or horizontal position to minimize shipping and storage space.

SUMMARY OF THE INVENTION

According to the present invention, a vehicle chair is provided which includes a seat frame for mounting to a floor, and a back frame pivoted to the seat frame for movement between a horizontal position and a generally upright position. In its horizontal position the chair can be stacked with other similar chairs for easy shipment and compact storage. It can be fixed in its upright position by mounting a rigid interconnecting member between abutment portions provided on the seat frame and the back frame, respectively.

The abutment portions can also be used as anchorage points for a recliner mechanism. Thus, the fixed chair can be converted to a reclinable chair by disconnecting the interconnecting member and substituting a recliner mechanism, and without any need for demounting the chair from the vehicle. The conversion can easily be accomplished by a vehicle owner interested in providing originally installed upright fixed chairs with all of the features that he would have had with originally installed recliner chairs.

The convertibility of the present chair enables a dealer to offer both fixed and recliner chair types to potential buyers, while yet stocking only a single chair frame.

The present method of converting the vehicle chair from one type to the other includes the steps of disconnectably attaching together suitable anchorages carried by the seat and back frames, thereby to constrain the frames against relative movement for a fixed chair, and providing supports on the seat and back frames to mount the cooperating portions of a recliner mechanism to adapt the chair for use as a recliner chair when the seat and back frame anchorages are disconnected.

Other objects and features of the invention will become apparent from consideration of the following description taken in connection with the accompanying drawings.

BRIEF DESCRIPTION OF THE DRAWINGS

FIG. 1 is a perspective view of a vehicle chair according to the present invention, fitted with a recliner mechanism for use of the chair as a recliner chair;

FIG. 2 is a view similar to FIG. 1, but illustrating the chair fitted with a rigid interconnecting member for use of the chair as a rigid chair;

FIG. 3 is an enlarged view taken along the line 3—3 of FIG. 1;

FIG. 4 is an enlarged view taken along the line 4—4 of FIG. 3;

FIG. 5 is a view taken along the line 5—5 of FIG. 3;

FIG. 6 is an enlarged view taken along the line 6—6 of FIG. 2; and

FIG. 7 is a partial perspective view of a second embodiment of the interconnecting member.

DESCRIPTION OF THE PREFERRED EMBODIMENTS

Referring now to the drawings, there is illustrated a vehicle chair 10 according to the present invention and comprising, generally, a seat frame 12 adapted for mounting to relatively fixed structure (not shown), such as the floor of a motor vehicle, and a back frame 14 mounted to the seat frame 12 for pivotal movement between the generally upright position illustrated and a horizontal position (not shown) in which the plane of the back frame 14 is generally horizontal and parallel to the floor.

The vehicle chair 10 is particularly adapted for use in motor vehicles, but is also adapted for use in various other types of structures. Moreover, although the components of the chair 10 are shown as having a particular configuration, it will be apparent that other configurations may be employed if desired. The components illustrated are primarily constituted of light weight structural tubing and metal plate appropriately covered with cushions and other upholstery (not shown), such as a pair of arm rests. Details of the upholstery are not part of the present invention and are therefore omitted for brevity.

The tubular, generally square seat frame 12 includes a front portion or tube 16 and a rear portion or tube 18. The tube 18 has an offset or jog in it, the longer section of the tube 18 extending from the left side of the seat frame, past the midpoint of the chair. There it is welded to the front portion of a short, longitudinally oriented plate 20, as best seen in FIG. 3. The shorter end of the tube 18 extending from the right side of the seat frame 12 is welded to the rearward portion of the plate 20.

A pair of parallel, downwardly opening, longitudinally extending, transversely spaced apart channels 24 are secured to the underside of the seat frame 12. The channels 24 are longitudinally slidable within a pair of complemental, upwardly open tracks 26 adapted to be secured to the vehicle floor. Although not shown in detail, since the arrangement is not part of the present invention, an elongated locking arm 28 is operative in one direction by a person seated in the chair 10 to permit longitudinal slidable movement of the seat frame 12 upon the tracks 26. The arm 28 is also operative in the opposite direction to effect locking engagement between a portion of the arm 28 and a plurality of cut-out portions or detents provided in the tracks 26 (not shown). Other arrangements can be provided to enable forward and rearward adjustment of the seat frame 12, as will be apparent, or such an adjustment mechanism can even be omitted if desired.

Depending from the right extremity of the front tube 16 is an abutment or mounting tab 30, as best seen in FIGS. 3 and 6, whose purpose will subsequently be described.

A pair of supports or hinge plates 32 project upwardly form opposite sides of the seat frame 12 adjacent the rear tube 18 and include aligned openings defining a transversely oriented, horizontal pivot axis 33.

The sides of the tubular, generally rectangular back frame 14 taper inwardly somewhat toward the top and, as best seen in FIGS. 1 through 3, the opposite lower corners of the frame 14 include a pair of supports or hinge plates 34 and 35. The plate 34 includes a transverse section 36 welded to the rear side of the left corner of the back frame 14, and a forwardly projecting section 38 having an opening for receiving a suitable pivot fastener to allow priotal movement of the back frame 14 about the pivot axis 33.

The hinge plate 35 on the opposite side of the back frame 14 is generally similar to the plate 34, including a forwardly projecting section 40 having an opening for receiving a suitable pivot fastener to allow pivotal movement of the back frame 14 about the pivot axis 33. However, the rear section 42 of the plate 34 extends inwardly farther than the corresponding section 36 of the hinge plate 34. Welded to the inner extremity of the section 42 is a downwardly and rearwardly inclined abutment or mount 44 which, as best seen in FIG. 5, terminates in a downwardly open, U-shape extremity.

In the fixed version of the chair 10, illustrated in FIGS. 2 and 6, an elongated interconnecting member 46 is detachably secured by suitable fasteners at its opposite ends, respectively, to the mounting tab 30 on the seat frame 12 and to the mount 44 on the back frame 14.

With the foregoing arrangement, the back frame 14 can be pivoted upon the seat frame 12 to a generally horizontal position, in which form a number of similar chairs 10 can be stacked for compact storage and shipment. When the chair 10 is to be installed as a fixed chair, the seat frame 12 is suitably secured to the vehicle floor, the back frame 14 is pivoted to the generally upright position of FIG. 2, and the interconnected member 46 is then fitted into position as previously illustrated. The resulting chair 10 is sufficiently rigid and rugged in construction to satisfy motor vehicle safety requirements.

Should the vehicle owner desire to convert the chair of FIG. 2 to a reclining type, he needed only remove the interconnecting member 46 and install a recliner mechanism 48, as best illustrated in FIGS. 1 and 3 through 5.

The recliner mechanism 48 is a fluid cylinder including portions 50 and 52 which telescope relative to one another during movement of the back frame 14 between its horizontal and upright positions. Various forms of such recliner mechanisms are well known to those skilled in the art, and details of the mechanism are therefore omitted for brevity. Such mechanisms are commonly employed in automobiles to adjust the raised position of "lift-back" rear hatches on automobiles, and in like situations.

Typically, the recliner mechanism 48 includes a laterally extending touch lever 54 movable in fore or aft directions to release or lock the portion 50 relative to the portion 52.

As best seen in FIG. 4, the touch lever 54 is pivoted at its inner end to a U-shaped fitting 56 carrier at the forward end of the telescopable portion 50. Pivotal movement of the touch lever 54 axially moves a plunger 58 which, as is well known to those skilled in the art, initiates locking or release of the portion 50, depending upon the direction in which the plunger 58 is moved. This enables the user to adjustably fix the back frame 14 in any of an infinite number of positions between the upright position illustrated, and a horizontal position in which the back frame 14 is generally parallel to the floor.

The depending orientation of the mount 44 on the back frame 14 locates the rearward extremity of the recliner mechanism 48 below the pivot axis 33 where it is easily accessible for interchanging the recliner mechanism 48 and the interconnecting member 46.

FIG. 7 illustrates a second embodiment of means for fixing the back frame 14 in its generally upright position. Instead of using the elongated interconnecting member 46, an apertured mounting tab or anchorage 60 is welded to the rear tube 18, and a nut and bolt assembly 62 extends through the aperture in the mount 44 to rigidly interconnect the mount 44 and the anchorage 60.

From the foregoing it will be seen that a method has been provided for converting the vehicle chair 10 from a fixed chair to a reclinable chair, the method comprising the steps of providing anchorages upon the seat frame 12 and the back frame 14 for fixed interconnection by a removable member such as the member 46 or the nut and bolt assembly 62. The method further includes the step of providing supports on the frames 12 and 14, such as the supports or mounts 30 and 44 adapted to mount the recliner cylinder portions 50 and 52 to allow adjustable movement of the back frame 14 between its upright and horizontal positions, once the interconnecting member 46 or assembly 62 is removed.

Various modifications and changes may be made with regard to the foregoing detailed description without departing from the spirit of the invention.

I claim:

1. A reclinable vehicle chair comprising:
(a) a generally rectangularly contoured seat frame adapted for mounting to a floor and including a front portion, a discontinuous rear portion having a first and second section rigidly coupled each to the other, said first section being displaced a greater distance from said front portion than said second section, and a pair of side portions having, respectively, a first pair of upwardly projecting hinge plates fixedly secured to said side portions of said seat frame and positionally located adjacent said seat frame rear portion, said first pair of hinge plates defining a horizontal pivot axis, said seat frame including first abutment means positioned adjacent said seat frame front portion;
(b) a back frame including a second pair of hinge plates pivotally connected, respectively, to said first pair of hinge plates for movement of said back frame about said pivot axis and between a generally upright position and a generally horizontal position, said back frame including second abutment means extending below said pivot axis in said upright position of said back frame, said second abutment means further extending to a position above said first section of said seat frame rear portion; and, (c) coupling means extending between said first and second abutment means for fastening said first and second abutment means each to the other, said coupling means extending substantially internally of said seat frame rectangular contour.

2. The reclinable vehicle chair as recited in claim 1 where said coupling means is an elongated recliner mechanism adapted for angular displacement of said back frame with respect to said seat frame.

3. The reclinable vehicle chair as recited in claim 1 where said coupling means is a rigid elongated member.

* * * * *